2

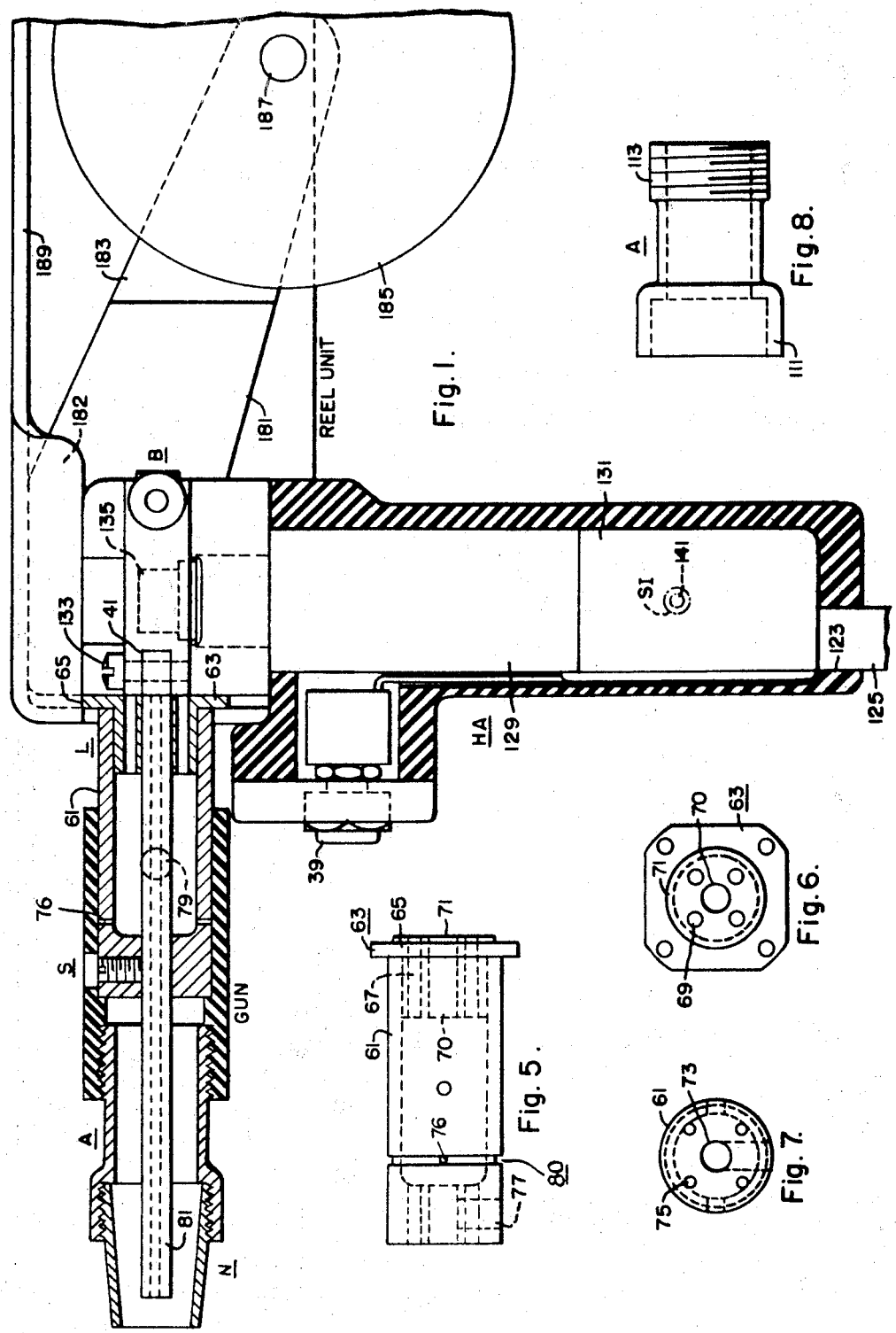

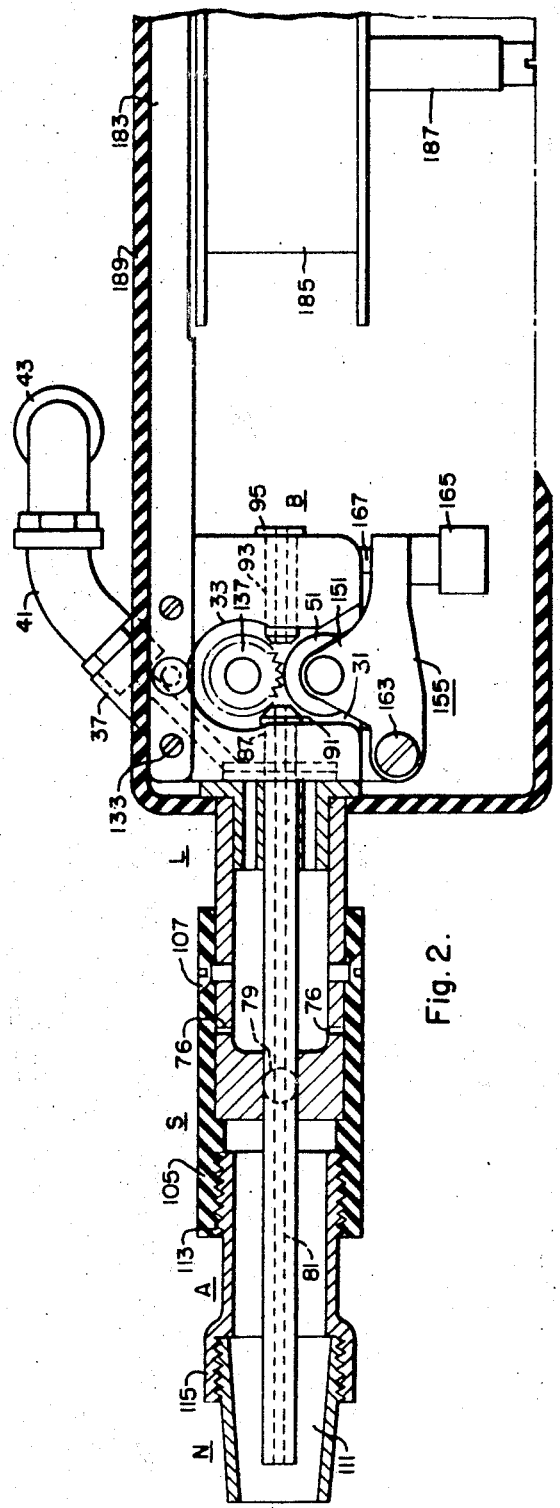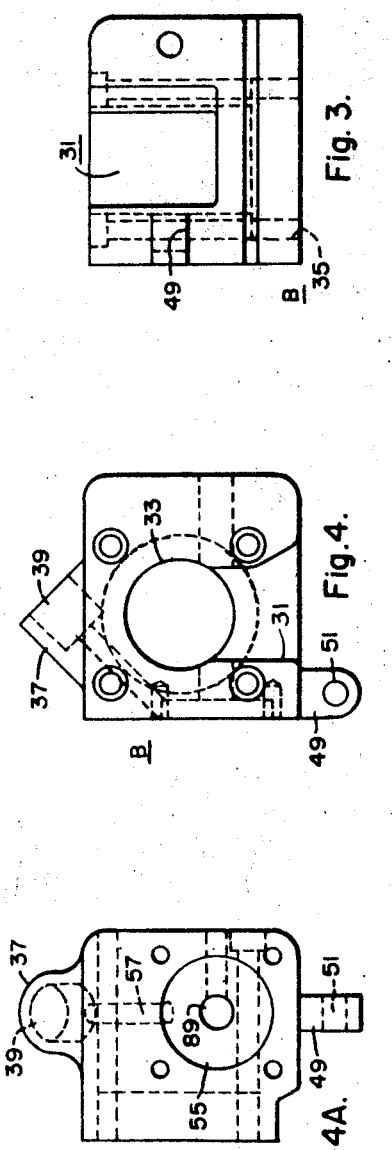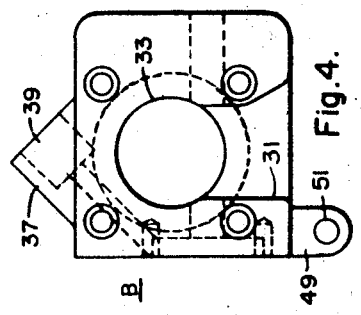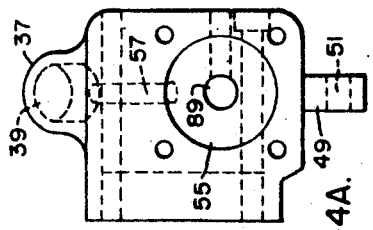

United States Patent Office 3,038,990
Patented June 12, 1962

3,038,990
ARC WELDING APPARATUS
George H. Cotter, Springville, and Harry J. Bichsel, East Aurora, N.Y., assignors to Westinghouse Electric Corporation, East Pittsburgh, Pa., a corporation of Pennsylvania
Filed Oct. 16, 1957, Ser. No. 690,526
16 Claims. (Cl. 219—130)

This invention relates to arc welding apparatus and has particular relationship to arc welding guns.

Arc welding with a consumable electrode of relatively soft material, such as aluminum, and of relatively small diameter, for example between .020" and .0625", is in accordance with the teachings of the prior art facilitated by providing a gun with an electrode transmission channel which includes drive means between the electrode entrance terminal of the channel and the electrode exit terminal. It is also the practice in accordance with the teachings of the prior art to mount the motor for driving the electrode drive means directly on the gun. So that the gun may be readily handled, it would be desirable that the motor be relatively small. But such a motor has relatively low power and starting torque, and difficulty is encountered in feeding the electrode continuously as required for a proper welding operation.

It is then an object of this invention to provide an arc welding assembly including a compact gun readily manipulated and particularly suitable for feeding an electrode of relatively soft material and of small diameter, and having drive means actuable by a small motor on the gun between the electrode entrance channel and the electrode exit channel of the gun.

It is another object of this invention to provide such a gun capable of feeding the electrode with the continuity demanded for high quality work.

An incidental object of this invention is to provide a gun for welding with a consumable electrode, particularly an electrode of relatively soft material and relatively small diameter, which shall include electrode drive means permitting ready threading of the electrode through the gun.

Another incidental object of this invention is to provide an arc welding gun for welding in a shield of gas in the use of which the aspiration of the air into the shield shall be suppressed.

A further incidental object of this invention is to provide control apparatus of simple structure for consumable electrode arc welding including inching and operating means so interlocked that only one of these means can be rendered effective by the operator.

This invention, in its broader aspects, arises from the realization that the flexible insulating cable through which the electrode in prior art welding assemblies is advanced to the gun is at the root of the difficulties involved in such assemblies. The conduit is used to prevent the contact of the electrode, which is electrically "hot," with people or objects. In passing through the conduit from the reel to the entrance end of the electrode channel in the gun, the electrode engages the walls of the cable and the frictional force between the electrode and the walls substantially impedes the starting and the running of the driving mechanism. In addition, the slackness or tension in the substantial length of electrodes between the reel and the entrance end of the gun adversely affects the continuity of the feeding of the electrode into the arc.

In accordance with this invention, the electrode supply means is mounted directly on the gun so that the distance between the electrode and the entrance end of the electrode channel in the gun is minimized. In this case there is only a short length of electrode between the supply means and the entrance end and an insulating flexible cable is not necessary so that the electrode is not impeded. Nor is there any tendency of the electrode in this length to fluctuate appreciably between slackness and tension. A continuous arc is maintained and high quality welds are produced. The welding assembly in accordance with this invention, is also highly compact since it includes the electrode supply and the gun in a single unit.

In the assemblies, in accordance with this invention, the arc is shielded by gas which is supplied through a so-called power-gas cable; that is a hollow cable including an electrical conductor for conducting the current from the welding power supply unit as well as the gas. In addition, the assembly includes a control cable. Both the power-gas cable and the control cable are connected to the gun and in using the assembly, the operator is only concerned with the movement of these two cables, and his movements are not hampered by the electrode and its flexible conduit. The assembly is then highly maneuverable.

The gun, in accordance with this invention, includes a hollow handle of insulating material. This handle is so connected to the barrel portion of the gun that the cavity in the handle subtends the region between the entrance end and the exit end of the electrode channel where the electrode is to be driven. The drive motor is in accordance with an aspect of this invention in this cavity and the drive shaft of the motor extends into the region subtended and carries a knurled roller for advancing the electrode. A cooperative roller is pivotally mounted on the gun adjacent this region so that it may be pivoted from a position out of engagement with the drive roller to a position into engagement with the drive roller. When the cooperative roller is in the former position, the electrode may be readily threaded into the gun.

The novel features considered characteristic of this invention are disclosed generally above. The invention itself both as to its organization and as to its method of operation together with additional objects and advantages thereof may be understood from the following description of a specific embodiment when read in connection with the accompanying drawings, in which:

FIG. 1 is a view in side elevation of a welding assembly in accordance with this invention;

FIG. 2 is a view in top elevation of the welding assembly shown in FIG. 1;

FIG. 3 is a view in side elevation of a bracket of the gun included in the assembly shown in FIG. 1;

FIG. 4 is a view in top elevation of this bracket;

FIG. 4A is a view in end elevation of this bracket;

FIG. 5 is a view in side elevation of a barrel of the gun included in the assembly shown in FIG. 1;

FIGS. 6 and 7 are views in end elevation of this barrel;

FIG. 8 is a view in side elevation of the adapter of the gun of the assembly shown in FIG. 1;

Figure 9:
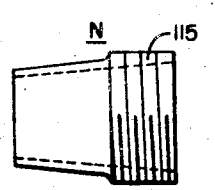
FIG. 9 is a view in side elevation of the nozzle of the gun of the assembly shown in FIG. 1.

A welding assembly in accordance with this invention includes a GUN and a REEL UNIT. The GUN is of generally right-angular form including a handle HA from which a barrel assembly extends at right angles. The barrel assembly includes a bracket B (FIGS. 3 and 4), a barrel L (FIGS. 5, 6 and 7), and adapter A (FIG. 8) and a nozzle N (FIG. 9).

The bracket B is of a suitable metal such as aluminum and has generally the form of a block having a relatively deep rectangular opening 31 in one of its faces. The opening 31 communicates with a cylindrical opening 33 extending along the length of the block parallel to the opening 31. The latter is counterbored at the lower end 35. A boss 37 having a threaded opening 39 therein to accommodate a pipe fitting 41 (FIG. 2) extends at an angle of about 45° from the face behind the rectangular opening 31. The fitting 41 is connected to the gas-power cable 43. The electrical conductor (not shown) of the cable is connected to the block through the fitting 41 and shielding gas is supplied through the cable to the opening 39.

Figure 15:
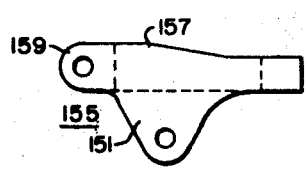
FIG. 15 is a view in top elevation of a roller bracket-arm of the gun of the assembly shown in FIG. 1.
Figure 16:
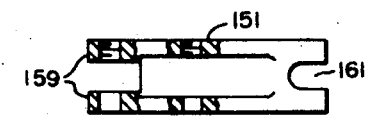
FIG. 16 is a view in side elevation of this bracket arm.

A boss 49 of generally cylindrical form having an opening 51 therein extends from the face adjacent the rectangular opening 31. This boss 49 serves as a hinge sleeve for the bracket (FIGS. 15 and 16) which carries the idler roller 53.

The bracket B has a shallow circular indentation 55 in one of the faces at right angles to the face in which the rectangular opening 31 extends and the pipe-fitting opening 39 in the boss 37 communicates with this indentation through a narrow channel 57.

The barrel L (FIGS. 5, 6 and 7) includes a shell 61 in one end of which a cap 63 is brazed. The cap has a rectangular head 65 and a stem 67, the stem engaging the inner surface of the shell. A plurality of transverse openings 69 and a central opening 70 extend through the cap. From the center of the cap a thin circular projection 71 extends. At the end opposite the cap the shell 61 includes a central opening 73 coaxial with the opening 70 and a plurality of longitudinal openings 75 around the center opening. The openings 70 and 73 accommodate an electrode guide tube 81 and the shell 61 is provided with a lateral threaded opening 77 for a set screw 79 which holds the tube 81. The barrel L is provided with a plurality of lateral openings 76 of small diameter which extend from the space within the shell 61 to an annular groove 80 on the outside surface of the shell.

The barrel L is secured to the bracket B the head 65 of the cap 63 engaging the face in which the shallow circular indentation 55 is provided. When the shell is so secured, there is a thin cylindrical space between the end 71 of the cap and the bracket B with which the narrow channel 57 in the boss 37 communicates. The barrel L and guide tube 81 are composed of conducting material.

A bushing 87 extends through a central opening 89 from the rectangular opening 31 in the bracket B through the bracket and into the shell 61. The bushing 87 is coaxial with the electrode guide tube 81. The bushing has a narrow flange 91 which engages the wall of the opening 31 and is composed of a low-friction material such as nylon. Another bushing 93 extends into the opening 39 from the face of the bracket B opposite to that to which the barrel L is secured. The latter bushing also has a narrow flange 95 engaging the face of the bracket B and is coaxial with the first bushing 87 and guide tube 81 so that an electrode threaded through the bushing 93 passes through the other and the guide tube 81 without being flexed.

Figure 10:
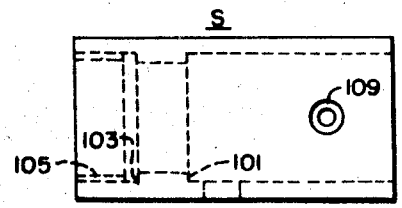
FIG. 10 is a view in side elevation of the sleeve of the gun of the assembly shown in FIG. 1.
Figure 11:
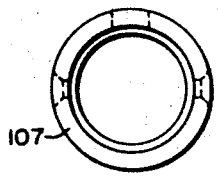
FIG. 11 is a view in end elevation of this sleeve.

The sleeve S (FIGS. 10, 11) is composed of an insulating material such as melamine and is of generally cylindrical form having a pair of shoulders 101 and 103 separated by a narrow neck near one end thereof. The portion 105 of the sleeve S extending from the shoulder 103 near this end is internally threaded. The other portion 107 of the sleeve is dimensioned to engage the barrel L firmly from the end remote from the cap 63 with the end of the barrel L engaging the shoulder 101. The portion 107 of the sleeve S has an opening 109 therein through which a tool may be inserted to loosen or tighten the set screw 79 which holds the electrode guide tube 81.

The adapter A (FIG. 8) is of generally cylindrical form having a knurled section 111 extending from a shoulder at one end and an externally threaded ring 113 extending from a shoulder at the other end. The knurled ring is internally threaded. The adapter 111 is secured in the sleeve S with the external thread 113 engaging the internal thread 105 in the sleeve.

The nozzle N (FIG. 9) is of generally tapered form both internally and externally and has a threaded head 115. The nozzle N is secured to the adapter A, the head 115 being screwed into the knurled ring 111.

Figure 14:
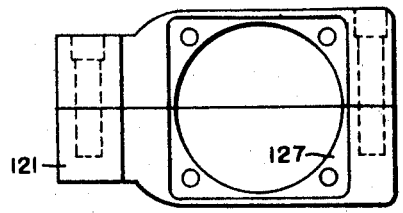
FIG. 14 is a view in end elevation of the top of this handle.
Figure 12:
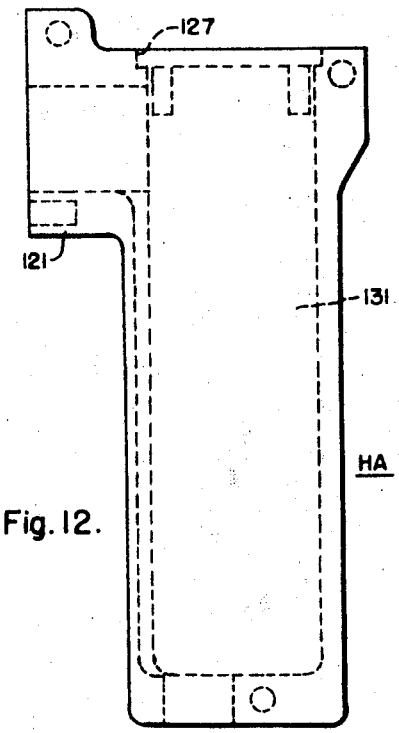
FIG. 12 is a view in side elevation of the handle of the gun of the assembly shown in FIG. 1.
Figure 13:
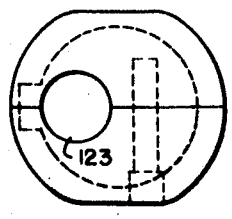
FIG. 13 is a view in end elevation of the base of this handle.

The handle HA (FIGS. 12, 13 and 14) is of generally cylindrical structure thickened at the top and having a boss 121 extending laterally from one side at the top. The handle HA is hollow but is open at the top and closed at the base except for an opening 123 through which a cable 125 carrying the control conductors extends. The opening at the top is bounded by a recess 127. A small gear motor 129, in accordance with the specific aspects of this invention preferably of the direct current type requiring a potential of the order of 24 volts, is provided for driving the electrode. In accordance with the broader aspects of this invention other motors (for example a universal motor) may be used. The motor and its gear unit are mounted together in a cylindrical casing having a narrow flange. The flange engages the recess 127 in the top of the handle HA and the motor extends into the cavity 131 in the handle.

The handle HA is secured to the lower face of the bracket B by bolts 133 extending through the bracket B parallel to the opening 31 and screwed into the periphery of the handle HA. The drive shaft 135 of the gear motor 129 extends through the openings 35—33 at the face of the bracket B which abuts the upper rim of the handle HA and carries at its upper end, a driving roller 137 having a knurled face. Within the recess in the boss 121 a starting switch SS is provided. This switch is actuable by a button 139 extending through a cover for the recess. In addition, an inching switch SI and button 141 may be provided in the cavity 131 below the motor 129. The handle HA is of insulating material.

The idler roller 51 which cooperates with the knurled drive roller 137 is rotatably mounted between the arms 151 of a bifurcated bracket 155 (FIGS. 15, 16), pivotally suspended from the boss 41 extending from the face of the bracket B.

The projections 151 extend from strips 157 each of which terminates in hinge sleeves 159 on one side and in a slot 161 on the other side. The sleeves 159 are disposed on both sides of the base 151 and the bracket 155 and idler 51 may be pivoted about a bolt 163 from which the bracket 155 is suspended from a position outside of the opening 31 in the bracket B to a position within the opening 31 in which the idler 51 engages the knurled roller 137. The idler 51 is held in the latter position by a knurled ring 165 which screws onto a pin 167 extending through the slot 161 into the bracket B. A compression ring (not shown) is attached to the knurled ring 165 and serves to hold the idler 51 firmly in the inward position.

Figure 18:
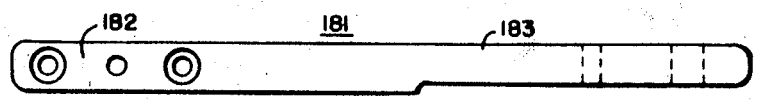
FIG. 18 is a view in top elevation of this reel bracket.
Figure 17:
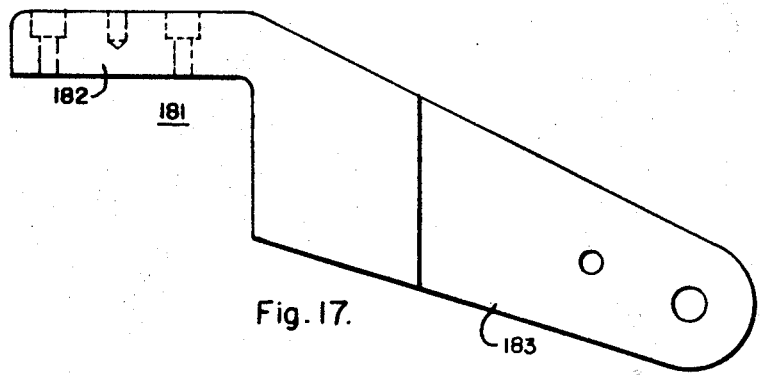
FIG. 17 is a view in side elevation of a reel bracket included in the assembly shown in FIG. 1.

The REEL UNIT (FIGS. 17 and 18) includes a bracket 181 having a supporting strip 182 which is secured to the top of the bracket B. From this strip an arm 183 extends at an oblique angle in the end of which a reel 185 is mounted rotatably on a pin 187. A shield 189 of insulating material extends over the REEL UNIT and bracket B. The reel 185 is composed of pressed wood; the shield 189 of insulating material.

The assembly disclosed herein may be used either with a constant current or a constant potential arc welding power supply unit. But the control circuits for the two power supply units are different.

Figure 19:
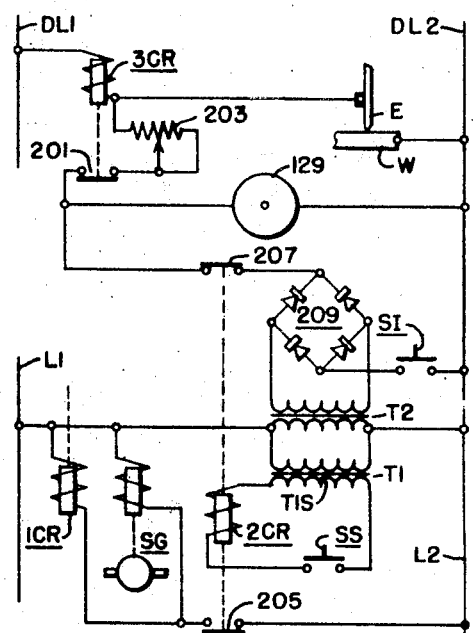
FIG. 19 is a diagram showing the control circuit of apparatus in accordance with this invention when such apparatus is used with a welding power supply unit of the constant current type.
Figure 20:
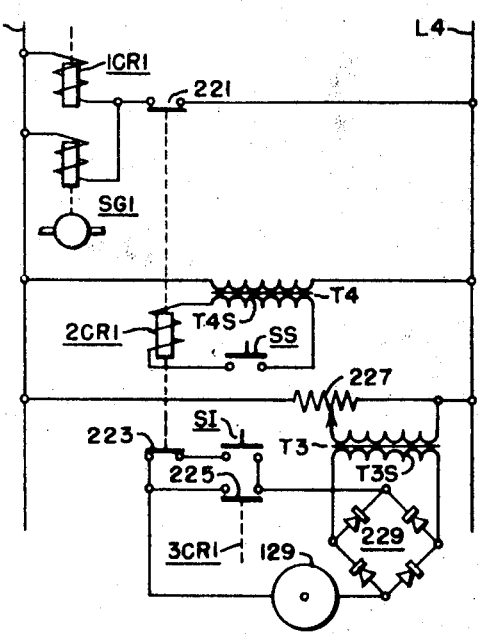
FIG. 20 is a diagram of a control circuit of the apparatus in accordance with this invention when this apparatus is used with a welding power supply unit of the constant potential type.

FIG. 19 is a circuit diagram of the control circuit when the apparatus is operated with a constant current welding power supply unit. In this case, the motor 129 derives its potential from the potential available between the electrode E and the work W during welding. Power for welding is supplied through conductors DL1 and DL2 which in the preferred practice of this invention supply direct current. Conductor DL1 is connected to the electrode and passes through the coil of a current relay 3CR. Conductor DL2 which is usually grounded, is directly connected to the work W. The relay 3CR has a normally open contact 201 and the electrode drive motor 129 is connected between the electrode E and the work W through this contact 201 and through a rheostat 203 for adjusting the motor voltage. The control circuit also includes control conductors L1 and L2, a relay 1CR, a relay 2CR and a solenoid SG controlling the shielding gas. The relay 1CR (contacts not shown) is connected in the power supply unit and includes contacts which close the energization circuit for the power supply unit. The relay 2CR includes a normally open contact 205 and a normally closed contact 207. The coil of the relay 1CR and the solenoid are adapted to be connected between conductors L1 and L2 through the normally open contact 205 of the relay 2CR. The coil of the relay 2CR is adapted to be connected across the secondary T1S of a transformer T1 energized from the conductors L1 and L2 through the welding gun switch SS. The circuit including the switch SS and the coil of relay 2CR is a low voltage circuit having an open circuit voltage of about 6 volts R.M.S. For inching the motor 129 is adapted to be supplied from a rectifier 209 energized from the conductors L1 and L2 through a transformer T2 and through the normally closed contact 207.

The control circuit for the assembly when it is used with a constant-potential power supply unit is energized from conductors L3 and L4 and includes a relay 1CR1, a solenoid SG1, and a relay 2CR1. In this case also, the power supply unit includes a current relay 3CR1 having a normally open contact 225. The relay 1CR1 like the relay 1CR has contacts (not shown) for closing the energizing circuit for the welding power supply unit. The relay 2CR1 has a normally open contact 221 and a normally closed contact 223. The relays 2CR and 2CR1 are of the double throw type contacts 205 and 207 and 223 and 221 respectively, being closed by actuation of a single arm. Thus, it is possible for only one of these contacts to be closed depending on the state of energization of the relay.

The motor is adapted to be supplied from a transformer T3 which is energized from conductors L1 and L2 through a variable transformer 227. The secondary T3S of transformer T3 supplies a rectifier 229 which is adapted to be connected across the motor 129 through the normally open contact 225 of the relay 3CR1. The rectifier 229 is also adapted to be connected across the motor 129 through the normally closed contact 223 of the relay 2CR1 and the inching switch SI. The coil of the relay 1CR1 and the solenoid SG1 are adapted to be connected between conductors L3 and L4 through the normally open contact 221 of the relay 2CR1. The coil of the relay 2CR1 is adapted to be connected across the secondary T4S of a transformer T4 through the gun switch SS. The circuit including the coil of 2CR1 and the switch SS is a low voltage circuit of the order of 6 volts R.M.S. Because the contacts 205 and 207 and 221 and 223 of relays 2CR and 2CR1 are of the double throw type the actuating of switch SS and operation of relay 2CR or 2CR1 precludes operation of the inching circuit by closing SI. If SI and SS are closed simultaneously only one of the circuits, either the welding circuit or the inching circuit, but not both, are closed.

The closing of the gun switch SS energizes the solenoid SG so that gas is supplied to the reservoir between the bracket B and barrel L. From this reservoir the gas flows through openings 75 into the barrel L and through openings 69 through the nozzle N.

A portion of the gas flows through the openings 76 to the space between the sleeve S and the barrel L. The gas in the reservoir between the barrel L and the bracket B and the gas between the sleeve S and the barrel L prevent aspiration of air with the nozzle N.

When the apparatus is to be used, a reel having electrode wound thereon is mounted on the arm 185 of the REEL UNIT. The bifurcated bracket 155 is then moved to the position in which the idler roller 51 is outside of the opening 31 in the gun bracket B, and the electrode is threaded through the sleeve 93 in the gun bracket to a position where it engages the knurled roller 137. The bifurcated bracket 155 is then swung to a position in which the electrode is engaged between the idler roller 51 and the knurled roller 137. The inching switch SI is then actuated energizing the gun motor 129 so that the electrode is advanced through the adjacent bushing 91 and the guide tube 81 so that it projects from the end of the nozzle N. The assembly is then moved adjacent to the work W and the gun switch SS is closed. This actuates the relay 1CR or 1CR1 and the gas solenoid energizing the power supply unit. An arc is then fired between the electrode and the work by touching the electrode to the work and then removing it from the work and with the gun switch SS closed, the welding proceeds.

The electrode and the metal parts B, L, A, N of the gun are hot electrically but the operator is prevented from engaging the electrode or any of the metal parts by the insulating shield 189 and the remaining insulating parts surrounding the electrode and the gun.

In addition, the voltage impressed on the gun is in the normal operation of the apparatus, relatively low. When the supply unit is of the constant current type and the electrode and work are disengaged, the potential of the supply is across the normally open contact 201 of the relay 3CR which is in the power supply unit remote from the operator. When the electrode and the work are engaged the potential between the electrode and the work is equal to the arc drop and is of the order of 24 volts. The potential of the constant potential supply is relatively low.

While a preferred embodiment of this invention has been disclosed herein, many modifications thereof are feasible. The invention then is not to be restricted except insofar as is necessitated by the prior art.

We claim as our invention:

1. A welding gun for welding in a shield of gas including a barrel having a channel through which said gas is transmitted, said barrel having gas entrance means at one end thereof, a connection to said one end for supplying gas including a gas reservoir near said one end in which gas pressure is built up to prevent aspiration of air into said channel, an insulating sleeve encircling said barrel and a connection between said channel and said sleeve permitting the building up of gas pressure between said barrel and said sleeve preventing the aspiration of air into said channel through said sleeve.

2. A welding gun for welding in a shield of gas including a barrel having a channel through which said gas is transmitted, a sleeve enclosing said barrel, means connected to said barrel for supplying gas through said channel, and means connected to said barrel for preventing the aspiration of air into said channel, said preventing means including a connection between said barrel and sleeve for preventing the aspiration of air into said channel through said sleeve.

3. A welding gun assembly for arc welding with a consumable electrode comprising a block, a gun barrel including a nozzle, a channel for transmitting a shielding gas through said nozzle, and an electrode guide tube for transmitting an electrode through said nozzle ensheathed by said gas mounted on said block, means for mounting a reel including said consumable electrode mounted on said block spaced from the entrance of said guide tube and in electrode-delivery relationship with said entrance, a first bushing in said block on the side thereof adjacent said reel mounting means, a second bushing in said block on the side thereof adjacent said gun barrel, said bushings having openings aligned with said guide tube and providing a passage for an electrode from said reel to said guide tube, said bushings being spaced at their respective ends remote from said reel and guide tube, an electrode drive roller extending into said block so that its driving surface extends into the space between said bushings along the cylindrical surface coextensive with said openings on said bushings, and means pivotal on said block and cooperative with said driving roller for holding said electrode in engagement with said driving roller.

4. A welding gun assembly for arc welding with a consumable electrode comprising a block, a gun barrel including a nozzle, a channel for transmitting a shielding gas through said nozzle, and an electrode guide tube for transmitting an electrode through said nozzle ensheathed by said gas mounted on said block, means for mounting a reel including said consumable electrode on said block spaced from the entrance of said guide tube and in electrode-delivery relationship with said entrance, said block having a first opening adjacent said reel mounting means and a second opening adjacent said gun, said openings being aligned with said guide tube and providing a passage for an electrode from said reel to said guide tube, said openings being spaced at their respective ends remote from said reel and guide tube, an electrode drive roller extending into said block so that its driving surface extends into the space between said openings along the cylindrical surface coextensive with said openings, and means pivotal on said block and cooperative with said driving roller for holding said electrode in engagement with said driving roller.

5. A welding gun assembly for arc welding with a consumable electrode in a shield of gas including a hollow elongated handle, a block mounted on one end of said handle, electrode supply means mounted on said block adjacent one side of said block, a gun barrel mounted on said block adjacent the opposite side thereof, said barrel including a nozzle, a channel for transmitting a shielding gas through said nozzle, and an electrode guide tube for transmitting an electrode through said nozzle ensheathed by said gas, said block having coextensive openings aligned with said guide tube one opening adjacent said supply means and the other adjacent said guide tube, said openings providing a passage for said electrode from said supply means to said guide tube, said openings being spaced at their respective ends remote from said supply means and guide tube respectively, a drive roller extending into said block so that its driving surface extends into said space between said openings along the cylindrical surface coextensive with said openings, a motor in said handle connected to said roller for driving said roller, and means pivotal on said block cooperative with said driving roller for holding said electrode in engagement with said driving roller.

6. A compact readily manipulated welding assembly particularly for arc welding with a consumable electrode of a relatively soft material such as aluminum and of relatively small cross sectional dimensions, the said assembly including a gun having channel means through which said electrode is to be advanced continuously, said gun terminating in a bracket at one end thereof and said channel means having electrode entrance means in said bracket, electrode supply means mounted on said bracket adjacent said electrode entrance means, said channel means having electrode exit means at the end of said gun opposite said bracket, said bracket having an opening therein generally lateral to said channel means, a drive roller within said opening extending into said channel means in a position in which it is capable of engaging said electrode, an idler roller, means mounting said idler on said bracket to be pivoted manually from a first position outside of said opening to a second position in said opening, said idler roller pressing said electrode into engagement with said drive roller in said second portion, and means for driving said drive roller.

7. A compact readily manipulated welding assembly for arc welding with a consumable electrode including a gun having channel means through which said electrode is to be continuously advanced, said channel means having electrode entrance means at one end thereof and electrode exit means at the other end thereof, said exit means including a nozzle and electrically conducting electrode guiding means for guiding said electrode to said nozzle and also including a conduit enclosing said guiding means for conducting shielding gas to said nozzle, a power-gas cable connected to said conduit so as to transmit said shielding gas therethrough and including a power supply conductor electrically connected to said guiding means to supply power to said electrode, electrode driving rollers, means mounting said rollers adjacent said channel means between said entrance means and said exit means so that said rollers are capable of engaging said electrode and advancing said electrode through said channel means, an electric motor mechanically connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said rollers.

8. A compact readily manipulated welding assembly particularly for arc welding with a consumable electrode of a relatively soft material such as aluminum and of relatively small cross-sectional dimensions, the said assembly including a gun having channel means through which said electrode is to be advanced continuously, said channel means having electrode entrance means at one end thereof and electrode exit means at the other end thereof, electrode driving rollers, means mounting said rollers adjacent said channel means between said entrance means and said exit means so that said rollers are capable of engaging said electrode and advancing said electrode through said channel means, an electric motor mechanically connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said rollers.

9. A compact readily manipulated welding assembly particularly for arc welding with a consumable electrode of a relatively soft material such as aluminum and of relatively small cross-sectional dimensions, the said assembly including a gun having channel means through which said electrode is to be advanced continuously, said channel means having electrode entrance means at one end thereof, electrode driving rollers, means mounting said rollers adjacent said channel means between said entrance means and said exit means so that said rollers are capable of engaging said electrode and advancing said electrode through said channel means, a motor mounted on said gun mechanically connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said roller.

10. A compact readily manipulated welding assembly particularly for arc welding with a consumable electrode of a relatively soft material such as aluminum and of relatively small cross-sectional dimensions, the said assembly including a gun having channel means through which said electrode is to be advanced and hollow handle means connected to said channel means for holding said gun in welding position, said channel means having electrode entrance means at one end thereof and electrode exit means at the other end thereof, said handle means engaging said channel means between said entrance means and said exit means, electrode driving rollers, means mounting said rollers adjacent said channel means between said entrance means and said exit means and adjacent said handle means, so that said rollers are capable of engaging said electrode and advancing said electrode through said channel means, the opening in said handle means subtending said rollers, an electric motor mounted in said opening having a drive shaft extending through said opening, and means connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said rollers.

11. A welding assembly particularly for arc welding with a consumable electrode of relatively small cross-sectional dimensions, the said assembly including a gun having channel means through which said electrode is to be continuously advanced, said channel means having electrode entrance means at one end thereof and electrode exit means at the other end thereof, said exit means including a nozzle and electrically conducting electrode guiding means for guiding said electrode to said nozzle and also including a conduit enclosing said guiding means for conducting shielding gas to said nozzle, said conduit being devoid of fluid cooling means, electrode driving rollers, means mounting said rollers adjacent said channel means between said entrance means and said exit means so that said rollers are capable of engaging said electrode and advancing said electrode through said channel means, means connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said rollers.

12. An arc welding gun particularly for arc welding with a consumable electrode, said gun having channel means through which said electrode is to be continuously advanced, said channel means including electrode entrance means at one end thereof and electrode exit means at the other end thereof, said exit means including a nozzle and electrically conducting electrode guiding means for guiding said electrode to said nozzle, said electrode guiding means being in electrical and thermal contact with said electrode, said exit means also including a conduit enclosing said guiding means for conducting shielding gas to said nozzle, said conduit being in thermal interchange relationship with said electrode guiding means, said nozzle and the arc so that the shielding gas flowing therethrough is heated, said conduit being devoid of fluid cooling means, and means connected to said channel means for advancing an electrode therethrough.

13. An arc welding gun particularly for arc welding with a consumable electrode, said gun having channel means through which said electrode is to be continuously advanced, said channel means including electrode entrance means at one end thereof and electrode exit means at the other end thereof, said exit means including a nozzle and electrically conducting electrode guiding means for guiding said electrode to said nozzle, said electrode guiding means being in electrical and thermal contact with said electrode, said exit means also including a conduit enclosing said guiding means for conducting shielding gas to said nozzle, said conduit being in thermal interchange relationship with said electrode guiding means, said nozzle and the arc so that the shielding gas flowing therethrough is heated, said conduit being devoid of fluid cooling means, means connected to said conduit for supplying shielding gas therethrough, means connected to said gas supplying means and said conduit for preventing the aspiration of atmospheric air therethrough and means connected to said channel means for advancing an electrode therethrough.

14. A welding gun assembly for arc welding with a consumable electrode comprising a block, a gun barrel including a nozzle, a channel for transmitting a shielding gas through said nozzle, and an electrode guide tube mounted on said block for transmitting an electrode through said nozzle ensheathed by said gas, means for mounting a reel including said consumable electrode on said block spaced from the entrance of said guide tube and in electrode-delivery relationship with said entrance, said block having a first opening adjacent said reel mounting means and a second opening adjacent said gun, said openings being aligned with said guide tube and providing a passage for an electrode from said reel to said guide tube, electric motor drive means for said electrode in said block, and means connected intermediate said reel and guide tube for impressing a potential for providing a welding arc on said electrode.

15. A compact readily manipulated welding assembly particularly for arc welding with a consumable electrode of a relatively soft material such as aluminum and of relatively small cross-sectional dimensions, the said assembly including a gun having channel means through which said electrode is to be advanced continuously, said channel means having electrode entrance means at one end thereof and electrode exit means at the other end thereof, electrode driving rollers, means mounting said rollers adjacent said channel means between said entrance means and said exit means so that said rollers are capable of engaging said electrode and advancing said electrode through said channel means, an electric motor of the direct-current type mechanically connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said rollers.

16. A compact readily manipulated welding assembly particularly for arc welding with a consumable electrode of a relatively soft material such as aluminum and of relatively small cross-sectional dimensions, the said assembly including a gun having channel means through which said electrode is to be advanced continuously, said channel means having electrode entrance means at one end thereof, electrode driving rollers, means mounting said rollers adjacent said channel means between said entrance means and said exit means so that said rollers are capable of engaging said electrode and advancing said electrode through said channel means, a direct-current motor mounted on said gun mechanically connected to at least one of said rollers for driving said one of said rollers, and electrode supply means mounted on said gun adjacent said entrance means in a position such that a short length of electrode extends between said supply means and said entrance means as said electrode is advanced through said channel means, said electrode being advanced only by said roller.

References Cited in the file of this patent
UNITED STATES PATENTS

| | | |
|---|---|---|
| 1,853,101 | Henke | Apr. 12, 1932 |
| 2,222,574 | Robertson | Nov. 19, 1940 |
| 2,310,164 | Fundergast et al. | Feb. 2, 1943 |
| 2,376,265 | Meredith | May 15, 1945 |
| 2,454,875 | Hyde | Nov. 30, 1948 |
| 2,606,267 | McElrath | Aug. 5, 1952 |
| 2,636,102 | Lobosco | Apr. 21, 1953 |
| 2,662,201 | Wiley | Dec. 8, 1953 |
| 2,696,267 | McElrath | Dec. 7, 1954 |
| 2,719,245 | Anderson | Sept. 27, 1955 |
| 2,767,302 | Brashear | Oct. 16, 1956 |
| 2,768,280 | Renaudie | Oct. 23, 1956 |
| 2,808,498 | Hudson et al. | Oct. 1, 1957 |
| 2,836,705 | Cotter | May 27, 1958 |
| 2,871,333 | Savage | Jan. 27, 1959 |
| 2,900,488 | Bassot | Aug. 18, 1959 |

FOREIGN PATENTS

| | | |
|---|---|---|
| 1,095,434 | France | Dec. 22, 1954 |

---

UNITED STATES PATENT OFFICE
CERTIFICATE OF CORRECTION

Patent No. 3,038,990          June 12, 1962

George H. Cotter et al.

It is hereby certified that error appears in the above numbered patent requiring correction and that the said Letters Patent should read as corrected below.

In the drawings, Sheet 1, Fig. 1, strike out the circle designated 79 and the reference numeral 79; for the reference numeral "39" read -- 139 --; for the reference numeral "133" read -- 163 --; same Fig. 1, for the reference numeral "135" read -- 137 --; Sheet 2, Fig. 2, for the reference numeral "51" read -- 53 --; Sheet 3, Fig. 10, strike out the reference numeral "109"; column 3, line 72, for "93" read -- 95 --; same line 72, for "39" read -- 93 --; column 4, line 47, strike out "135"; same column 4, lines 57, 66, 69, 70 and 74, for "51", each occurrence, read -- 53 --; line 60, for "41" read -- 49 --; line 73, strike out "(not shown)"; column 6, line 12, for "75" read -- 69 --; line 13, for "69" read -- 75 --; lines 21 and 28, for "51", each occurrence, read -- 53 --; line 39, strike out "A, N", column 7, line 37, and column 10, line 30, after "gun" insert -- barrel --.

Signed and sealed this 12th day of May 1964.

(SEAL)
Attest:

ERNEST W. SWIDER          EDWARD J. BRENNER
Attesting Officer          Commissioner of Patents